(12) United States Patent
Kawasoe et al.

(10) Patent No.: US 12,034,205 B2
(45) Date of Patent: Jul. 9, 2024

(54) ARTIFICIAL-SATELLITE ANTENNA

(71) Applicant: IHI Corporation, Tokyo (JP)

(72) Inventors: Yuko Kawasoe, Tokyo (JP); Nobuo Sugimura, Tokyo (JP); Taku Izumiyama, Tokyo (JP)

(73) Assignee: IHI Corporation, Tokyo (JP)

( * ) Notice: Subject to any disclaimer, the term of this patent is extended or adjusted under 35 U.S.C. 154(b) by 446 days.

(21) Appl. No.: 17/342,673

(22) Filed: Jun. 9, 2021

(65) Prior Publication Data

US 2021/0296763 A1    Sep. 23, 2021

Related U.S. Application Data

(63) Continuation of application No. PCT/JP2019/036981, filed on Sep. 20, 2019.

(30) Foreign Application Priority Data

Dec. 13, 2018 (JP) .................................. 2018-233556

(51) Int. Cl.
| | | |
|---|---|---|
| H01Q 19/10 | (2006.01) | |
| B64G 1/44 | (2006.01) | |
| B64G 1/66 | (2006.01) | |
| H01Q 1/28 | (2006.01) | |
| H02S 20/30 | (2014.01) | |
| H02S 40/30 | (2014.01) | |

(52) U.S. Cl.
CPC .............. *H01Q 1/288* (2013.01); *B64G 1/443* (2013.01); *B64G 1/66* (2013.01); *H01Q 19/10* (2013.01); *H02S 20/30* (2014.12); *H02S 40/30* (2014.12)

(58) Field of Classification Search
CPC .......... H01Q 1/288; H01Q 1/443; H01Q 1/66; H01Q 19/10; H02S 20/30; H02S 40/30
See application file for complete search history.

(56) References Cited

U.S. PATENT DOCUMENTS 6,394,395 B1 * 5/2002 Poturalski .............. H01Q 1/288
244/172.7
2014/0263844 A1    9/2014 Cook, Jr. et al.

FOREIGN PATENT DOCUMENTS

| JP | 2007-221303 A | 8/2007 |
|---|---|---|
| JP | 2008-221876 A | 9/2008 |
| JP | 2008221876 A * | 9/2008 |
| JP | 2014-019238 A | 2/2014 |
| JP | 2015-168422 A | 9/2015 |

* cited by examiner

*Primary Examiner* — Henry Luong
(74) *Attorney, Agent, or Firm* — Oblon, McClelland, Maier & Neustadt, L.L.P.

(57) ABSTRACT

An artificial-satellite antenna mounted in an artificial-satellite including a satellite body, the artificial-satellite antenna includes solar cell panels, radiators, and conductors that are mechanically and electrically connected to the solar cell panels, in which the solar cell panels and conductors are used as reflectors.

20 Claims, 3 Drawing Sheets

ARTIFICIAL-SATELLITE ANTENNA

This application is a Continuation Application based on International Application No. PCT/JP2019/036981, filed on Sep. 20, 2019, which claims priority on Japanese Patent Application No. 2018-233556, filed on Dec. 13, 2018, the contents of which are incorporated herein by reference.

TECHNICAL FIELD

The present disclosure relates to an artificial-satellite antenna.

BACKGROUND ART

Patent Document 1 discloses an artificial-satellite including first and second antennas. The first and second antennas are artificial-satellite antennas that are considered to be a pair of unipole antennas or dipole antennas. Artificial satellites are also disclosed in Patent Document 2 and Patent Document 3.

CITATION LIST

Patent Literature

[Patent Document 1]
Japanese Unexamined Patent Application, First Publication No. 2007-221303
[Patent Document 2]
Japanese Unexamined Patent Application, First Publication No. 2015-168422
[Patent Document 3]
Japanese Unexamined Patent Application, First Publication No. 2008-221876

SUMMARY OF THE INVENTION

Technical Problem

In a relatively small artificial-satellite, that is, a small satellite and a nanosatellite, the unipole antenna or the dipole antenna is adopted as an antenna for communication with the ground (ground stations, including mobile stations) in order to reduce the weight and the storage volume. However, antenna performance of the unipole antenna or the dipole antenna is not always sufficient. A relatively large satellite can adopt an artificial-satellite antenna with more superior performance, but a relatively small artificial-satellite such as a small satellite or a nanosatellite employs the unipole antenna or the dipole antenna with insufficient performance.

The present disclosure has been made in view of the above circumstances, and an object thereof is to improve antenna performance while suppressing an increase in weight and volume.

Solution to Problem

A first aspect of the present disclosure is an artificial-satellite antenna mounted on an artificial-satellite including a satellite body, the artificial-satellite antenna includes a solar cell panel, a radiator, and a conductor that is mechanically and electrically connected to the solar cell panel, in which the solar cell panel and the conductor are configured to be used as reflectors.

According to a second aspect of the present disclosure, in the first aspect, the solar cell panel is configured to have a shape extending in one direction, and the conductor is configured to be connected to the solar cell panel via an elastic material, and to protrude from the solar cell panel on an extension line in the one direction when the solar cell panel is deployed.

According to a third aspect of the present disclosure, in the first or second aspect, the conductor is configured to be accommodated in a bent state with respect to the solar cell panel when the solar cell panel is not deployed, and held on the satellite body by a holding portion.

According to a fourth aspect of the present disclosure, in the third aspect, the holding portion is configured to be fused when the solar cell panel is deployed.

According to a fifth aspect of the present disclosure, in any one of the first to fourth aspects, in a case where a pair of the solar cell panels is provided, the conductor is configured to be provided on each of the solar cell panels.

According to a sixth aspect of the present disclosure, in any one of the first to fourth aspects, the conductor is configured to be a rod-shaped member.

According to a seventh aspect of the present disclosure, in any one of the first to fourth aspects, when the solar cell panel is deployed, the solar cell panel and the conductor are configured to be substantially linear when viewed from a direction perpendicular to an extending direction of the conductor and parallel to the solar cell panel.

According to an eighth aspect of the present disclosure, in any one of the first to fourth aspects, the solar cell panel and the conductor are configured to be reflectors that reflect radio waves radiated to the artificial-satellite toward the radiator.

According to the present disclosure, it is possible to improve antenna performance while suppressing an increase in weight and volume.

DETAILED DESCRIPTION OF THE EMBODIMENTS

Hereinafter, an embodiment of the present disclosure will be described with reference to the drawings.

Figure 1A:
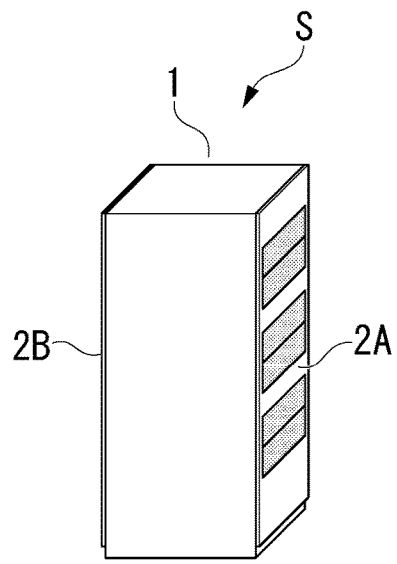
FIG. 1A is a schematic view showing a state before a solar cell panel of a small satellite is deployed in one embodiment of the present disclosure.

First, an artificial-satellite (nanosatellite S) on which an artificial-satellite antenna according to the present embodiment is mounted will be described with reference to FIGS. 1A and 1B. As shown in FIG. 1A, the nanosatellite S is substantially box-shaped in a state before solar cell panels 2A and 2B are deployed, and has a weight of about several kg to 100 kg.

In addition, the nanosatellite S includes a satellite body 1 and a pair of solar cell panels 2A and 2B as external components. As shown in the figure, the satellite body 1 is substantially box-shaped (substantially rectangular parallelepiped), and although built-in devices differ depending on the use of the nanosatellite S, the satellite body 1 includes a communication device, various measuring devices, and the like. In the satellite body 1 (nanosatellite S) shown in FIGS. 1A and 1B, a lower side (bottom plane) is a side (plane) facing the ground (earth) in a state where the nanosatellite S is orbiting the earth, for example.

The pair of solar cell panels 2A and 2B is dispersedly provided on the left and right sides of such a satellite body 1. That is, out of the pair of solar cell panels 2A and 2B, the solar cell panel 2A is provided on a left side plane (approximate plane) of the satellite body 1, and the solar cell panel 2B is provided on a right side plane (approximate plane) of the satellite body 1. In such solar cell panels 2A and 2B, a plurality of solar cells are provided on a surface of a flat plate-shaped support plate, and power is supplied to the satellite body 1. The support plate is made of a conductive material.

In addition, the pair of solar cell panels 2A and 2B is formed in the same shape, and is composed of rectangular and flat plate-shaped members having a long side and a short side of a predetermined length. That is, it can be said that the pair of solar cell panels 2A and 2B has a shape extending in one direction in which the long side extends. When the solar cell panels 2A and 2B are stored, out of the pair of solar cell panels 2A and 2B, the solar cell panel 2A is provided in a state of facing the left side plane of the satellite body 1 in parallel, and the solar cell panel 2B is provided in a state of facing the right side plane of the satellite body 1 in parallel.

Figure 1B:
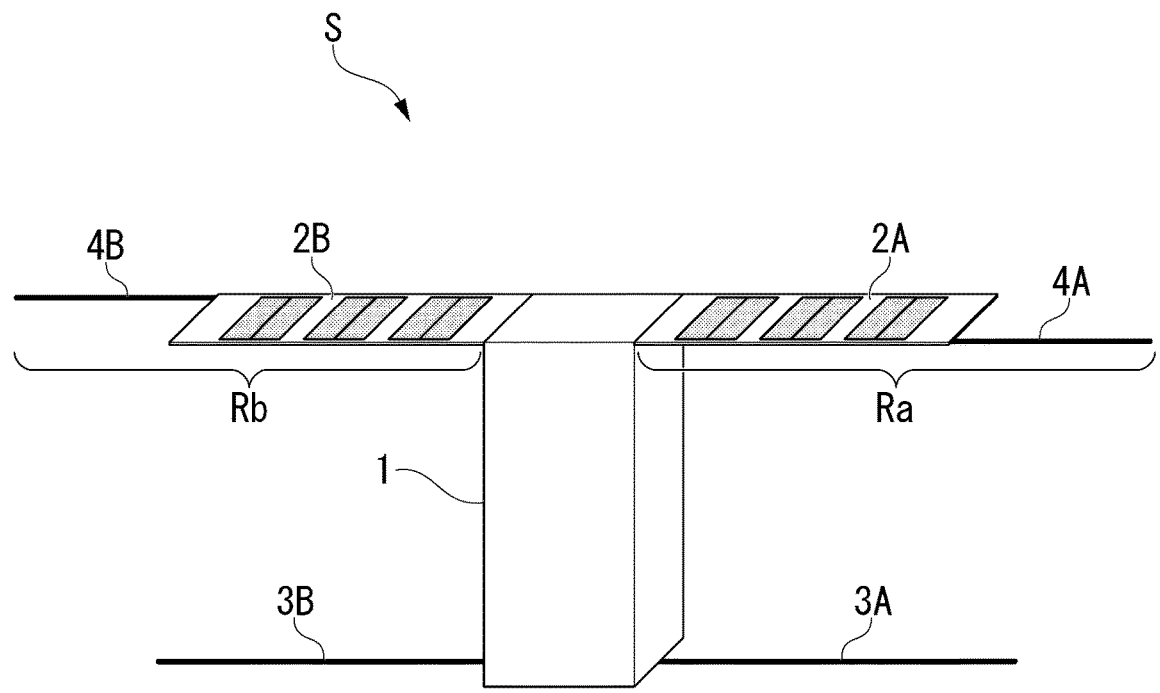
FIG. 1B is a schematic view showing a state after a solar cell panel of a small satellite is deployed in one embodiment of the present disclosure.

As shown in FIG. 1B, in such a nanosatellite S, in a state after the solar cell panels 2A and 2B are deployed, the pair of solar cell panels 2A and 2B protrudes to the left and right of the satellite body 1, and a pair of radiators 3A and 3B protrudes to the left and right of the satellite body 1. The pair of solar cell panels 2A and 2B is positioned on a rear side of the satellite body 1 in a case where an earth side (lower side) of the satellite body 1 is a front side.

On the other hand, the pair of radiators 3A and 3B is composed of rod-shaped members formed of a conductive material and is positioned on the front side of the satellite body 1. That is, the pair of solar cell panels 2A and 2B in a deployed state is positioned on the rear side of the pair of radiators 3A and 3B in the satellite body 1 (nanosatellite S).

In addition, in the deployed state, the pair of solar cell panels 2A and 2B is disposed substantially perpendicular to the satellite body 1. That is, the solar cell panel 2A protrudes leftward at an angle of approximately 90° with respect to the left side plane of the satellite body 1, and the solar cell panel 2B protrudes rightward at an angle of approximately 90° with respect to the right side plane of the satellite body 1. Accordingly, each of the pair of solar cell panels 2A and 2B protrudes to the left and right from the satellite body 1 substantially perpendicularly to the satellite body 1 and is disposed substantially linearly across the satellite body 1. Here, the angle of approximately 90° does not necessarily have to be an angle of 90° completely, but means an angle of approximately 90°.

Figure 2A:
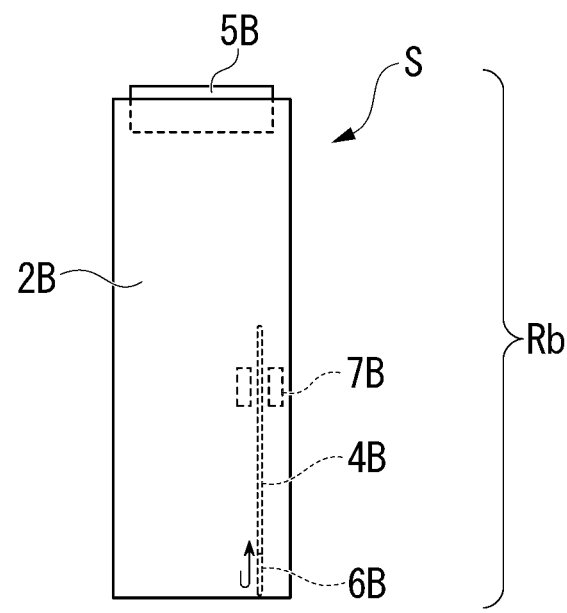
FIG. 2A is a schematic view showing a state before a solar cell panel of a small satellite is deployed in one embodiment of the present disclosure.
Figure 3A:
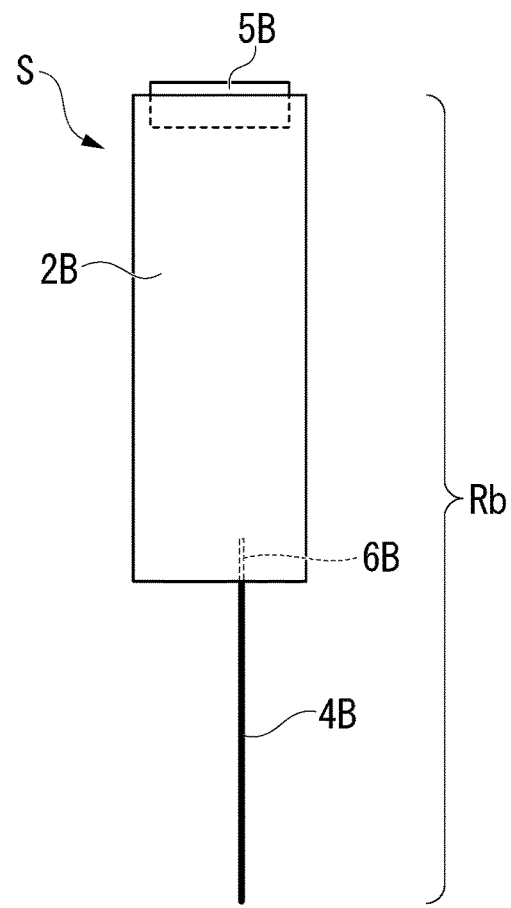
FIG. 3A is a schematic view showing a state after a solar cell panel of a small satellite is deployed in one embodiment of the present disclosure.

Rod-shaped members 4A and 4B are linearly connected to a distal end portion of each of the pair of solar cell panels 2A and 2B. These rod-shaped members 4A and 4B are conductors that are formed of a conductive material and protrude on an extension line of the pair of solar cell panels 2A and 2B when the solar cell panels 2A and 2B are deployed. Such rod-shaped members 4A and 4B are auxiliary parts for adjusting a length of the pair of solar cell panels 2A and 2B as conductors. Here, the rod-shaped members 4A and 4B may be provided on the extension lines of the long sides of the solar cell panels 2A and 2B as shown in FIG. 1B, but the rod-shaped members 4A and 4B may not be provided on the extension lines of the long sides of the solar cell panels 2A and 2B as shown in FIGS. 2A and 3A.

That is, the rod-shaped member 4A is linearly connected to the distal end portion of the solar cell panel 2A, and a total length of the solar cell panel 2A and the rod-shaped member 4A as conductors is set to a predetermined length. In addition, the rod-shaped member 4B is linearly connected to the distal end portion of the solar cell panel 2B, and a total length of the solar cell panel 2B and the rod-shaped member 4B as conductors is set to a predetermined length.

One end of each of the rod-shaped members 4A and 4B is mechanically and electrically connected to each support plate of the solar cell panels 2A and 2B. The rod-shaped members 4A and 4B constitute a pair of reflectors Ra and Rb together with the support plates of the solar cell panels 2A and 2B. That is, the solar cell panel 2A and the rod-shaped member 4A constitute the reflector Ra having a predetermined length, and the solar cell panel 2B and the rod-shaped member 4B constitute the reflector Rb having a predetermined length. The pair of reflectors Ra and Rb together with the pair of radiators 3A and 3B constitute the artificial-satellite antenna according to the present embodiment, and assist the pair of radiators 3A and 3B. Here, in a case where a thickness of the solar cell panels 2A and 2B and a diameter of the rod-shaped members 4A and 4B are substantially the same, the pair of reflectors Ra and Rb is configured in a substantially linear shape (substantially straight line shape) when viewed from a direction perpendicular to the extending direction of the rod-shaped members 4A and 4B and parallel to the solar cell panels 2A and 2B. Here, the substantially linear shape (substantially straight line shape) does not necessarily have to be a completely linear shape (straight line shape), but means that it may be an approximately linear shape (approximately straight line shape).

Each of the pair of radiators 3A and 3B is a unipole antenna, and is connected to a communication device in the satellite body 1. That is, out of the pair of radiators 3A and 3B, the radiator 3A is one of the unipole antennas and faces the reflector Ra in parallel and, the radiator 3B is the other unipole antenna and faces the reflector Rb in parallel.

The pair of radiators 3A and 3B is accommodated between a side plane of the satellite body 1 and the pair of solar cell panels 2A and 2B when the solar cell panels 2A and 2B are not deployed, and are deployed in the same direction as a deployment direction of the pair of solar cell panels 2A and 2B when the solar cell panels 2A and 2B are deployed. That is, when the solar cell panels 2A and 2B are not deployed, the radiator 3A is accommodated between the left side plane of the satellite body 1 and the solar cell panel 2A, and the radiator 3B is accommodated between the right side plane of the satellite body 1 and the solar cell panel 2B.

When the solar cell panels 2A and 2B are deployed, the radiator 3A is deployed in the same direction as the deployment direction of the solar cell panel 2A, and the radiator 3B is deployed in the same direction as the deployment direction of the solar cell panel 2B. That is, the pair of reflectors Ra and Rb and the pair of radiators 3A and 3B are in a positional relationship of facing each other in parallel when the solar cell panels 2A and 2B are deployed. The radiator 3A faces the reflector Ra in parallel, and the radiator 3B faces the reflector Rb in parallel. That is, when the reflector Ra is viewed in a direction perpendicular to the extending direction of the rod-shaped member 4A and parallel to the solar cell panel 2A, the reflector Ra and the radiator 3A are substantially parallel to each other. Similarly, when the reflector Rb is viewed in a direction perpendicular to the extending direction of the rod-shaped member 4B and parallel to the solar cell panel 2B, the reflector Rb and the radiator 3B are substantially parallel to each other. The above relationship is established in a case where a thickness of the solar cell panels 2A and 2B and a diameter of the rod-shaped members 4A and 4B are substantially the same. Accordingly, since the pair of solar cell panels 2A and 2B protrudes to the left and right from the satellite body 1 substantially perpendicularly to the satellite body 1 and is disposed substantially linearly across the satellite body 1, the pair of reflectors Ra and Rb and the pair of radiators 3A and 3B form a linear shape substantially parallel to each other. Between the pair of radiators 3A and 3B and the satellite body 1, a pair of deployment devices (not shown) for deploying the pair of radiators 3A and 3B from an undeployed state is individually provided. Here, substantially parallel means that it does not necessarily have to be completely parallel, but may be approximately parallel.

Figure 2B:
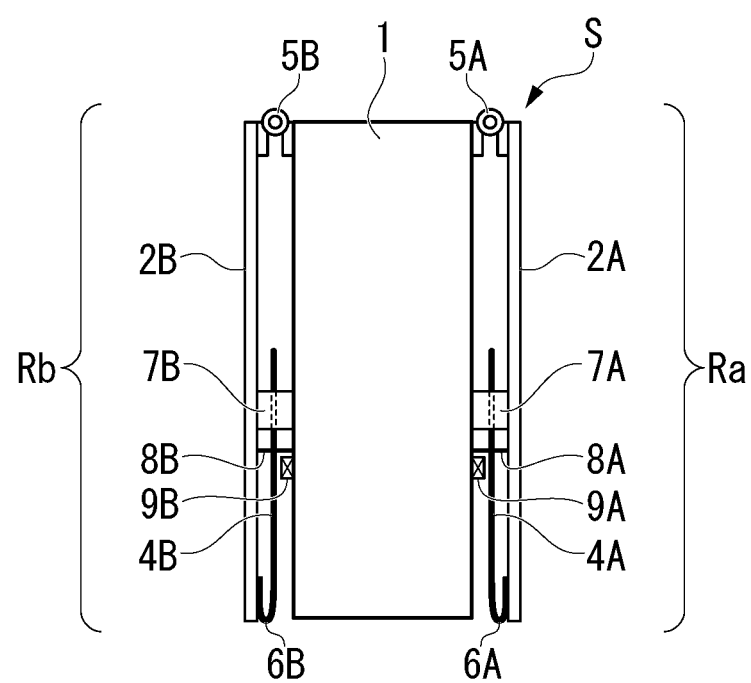
FIG. 2B is a schematic view showing a state before a solar cell panel of a small satellite is deployed in one embodiment of the present disclosure.

Subsequently, a connection structure between the pair of reflectors Ra and Rb and the satellite body 1 will be described with reference to FIGS. 2A and 2B and FIGS. 3A and 3B. Here, FIGS. 2A and 2B are schematic views showing a state before the solar cell panels 2A and 2B of the satellite body 1 are deployed, and FIGS. 3A and 3B are schematic views showing a state after the solar cell panels 2A and 2B of the satellite body 1 are deployed.

Figure 3B:
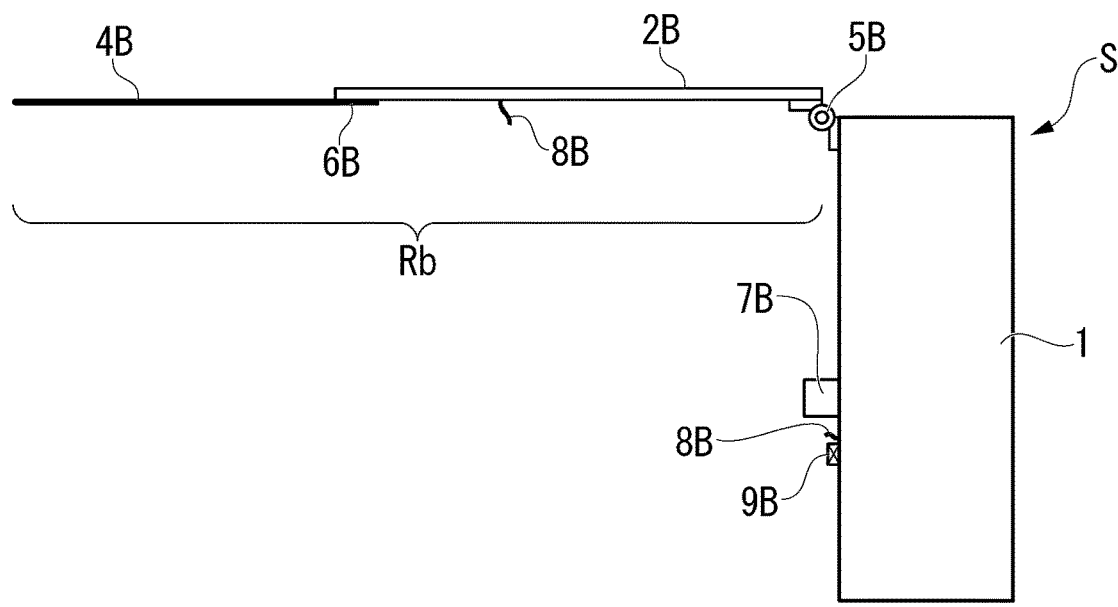
FIG. 3B is a schematic view showing a state after a solar cell panel of a small satellite is deployed in one embodiment of the present disclosure.

Since the pair of reflectors Ra and Rb has the same connection structure to be connected to the satellite body 1, only the reflector Rb is shown as a representative of the pair of reflectors Ra and Rb in FIGS. 2A, 3A and 3B. In FIGS. 2A and 2B, and 3A and 3B, FIG. 2A shows a state before the reflector Rb is deployed, and FIG. 2B shows a state before the pair of reflectors Ra and Rb is deployed. FIG. 2A is a front view of the reflector Rb, and FIG. 2B is a side view of the pair of reflectors Ra and Rb. Further, FIGS. 3A and 3B show the state after the reflector Rb is deployed, FIG. 3A is the front view of the reflector Rb, and FIG. 3B is the side view of the reflector Rb.

As shown in FIGS. 2A and 2B, and 3A and 3B, the pair of solar cell panels 2A and 2B, which is a component of the pair of reflectors Ra and Rb, has end portions of the solar cell panels 2A and 2B positioned on the rear side of the satellite body 1 (nanosatellite S) rotatably connected to the side plane of the satellite body 1 by a pair of hinges 5A and 5B. The pair of hinges 5A and 5B functions as connectors that include a rotating shaft parallel to a rear end plane of the satellite body 1 and a rear end side of the pair of solar cell panels 2A and 2B, and rotatably connect the pair of solar cell panels 2A and 2B to the side plane of the satellite body 1 in a predetermined rotation range.

That is, out of the hinges 5A and 5B, the hinge 5A includes a rotating shaft parallel to the rear end plane of the satellite body 1 and the rear end side of the solar cell panel 2A, and rotatably connects the solar cell panel 2A to the left side plane of the satellite body 1. The hinge 5B includes a rotating shaft parallel to the rear end plane of the satellite body 1 and the rear end side of the solar cell panel 2B, and rotatably connects the solar cell panel 2B to the right side plane of the satellite body 1.

The hinges 5A and 5B store the solar cell panels 2A and 2B parallel to the side plane of the satellite body 1 when the solar cell panels 2A and 2B are not deployed. In addition, an urging member such as a spring is incorporated in the rotating shafts of the hinges 5A and 5B. The hinges 5A and 5B deploy the solar cell panels 2A and 2B such that the maximum rotation angle is substantially 90°, that is, the solar cell panels 2A and 2B are disposed substantially perpendicular to the side plane of the satellite body 1 by an urging force of the urging member acting as a starting force.

The rod-shaped members 4A and 4B are connected to the distal end portion of the solar cell panels 2A and 2B via elastic materials (connection springs) 6A and 6B. That is, out of the elastic materials 6A and 6B, the elastic material 6A is provided at the distal end portion of the solar cell panel 2A, and the elastic material 6A bendably connects the rod-shaped member 4A to the solar cell panel 2A. The elastic material 6B is provided at the distal end portion of the solar cell panel 2B, and the elastic material 6B bendably connects the rod-shaped member 4B to the solar cell panel 2B.

The elastic materials 6A and 6B are, for example, coil springs or plate springs, and accommodate the rod-shaped members 4A and 4B between back sides of the solar cell panels 2A and 2B, that is, between the solar cell panels 2A and 2B and the side planes of the satellite body 1 by bending the rod-shaped members 4A and 4B with respect to the solar cell panels 2A and 2B when the solar cell panels 2A and 2B are not deployed. In addition, the elastic materials 6A and 6B deploys the rod-shaped members 4A and 4B in such a state that the rod-shaped members 4A and 4B are stretched substantially in a straight line with respect to the solar cell panels 2A and 2B when the solar cell panels 2A and 2B are deployed. The substantially straight line does not necessarily have to be a completely straight line, but may be an approximately straight line.

In addition, on the side plane of the satellite body 1, holding members 7A and 7B are provided corresponding to the rod-shaped members 4A and 4B. That is, the holding member 7A is provided on the left side plane of the satellite body 1 corresponding to the rod-shaped member 4A, and the holding member 7B is provided on the right side plane of the satellite body 1 corresponding to the rod-shaped member 4B. Such holding members 7A and 7B are members that positions the rod-shaped members 4A and 4B when the rod-shaped members 4A and 4B are stored, and hold a part of the rod-shaped members 4A and 4B.

Further, between the side plane of the satellite body 1 and the solar cell panels 2A and 2B, holding lines 8A and 8B which can be fused are provided. That is, the holding line 8A is provided between the left side plane of the satellite body 1 and the solar cell panel 2A corresponding to the solar cell panel 2A, and the holding line 8B is provided between the right side plane of the satellite body 1 and the solar cell panel 2B corresponding to the solar cell panel 2B.

Such holding lines 8A and 8B are connecting lines that maintain the solar cell panels 2A and 2B and the rod-shaped members 4A and 4B in the undeployed state. Such holding lines 8A and 8B are individually fused by cutting devices 9A and 9B individually provided on the side plane of the satellite body 1. The cutting device 9A, out of the cutting devices 9A and 9B, fuses the holding line 8A by heating the holding line 8A to a predetermined temperature (fusing temperature), and the cutting device 9B fuses the holding line 8B by heating the holding line 8B to a predetermined temperature (fusing temperature).

The holding members 7A and 7B, the holding lines 8A and 8B, and the cutting devices 9A and 9B constitute the holding portion of the present disclosure.

Next, the effects of the nanosatellite S in the present embodiment and the artificial-satellite antenna according to the present embodiment will be described in detail.

When the nanosatellite S is put into orbit, the pair of cutting devices 9A and 9B is activated to move the pair of solar cell panels 2A and 2B and the rod-shaped members 4A and 4B from the undeployed state to the deployed state. That is, when the pair of cutting devices 9A and 9B is activated and the pair of holding lines 8A and 8B is fused, the urging force of the urging member incorporated in the rotating shaft of the pair of hinges 5A and 5B acts on the pair of solar cell panels 2A and 2B as a starting force.

The pair of solar cell panels 2A and 2B facing the side plane of the satellite body 1 in parallel in the undeployed state is deployed in a state substantially perpendicular to the side plane of the satellite body 1 by the urging force (starting force). Further, at the same time, an elastic force of the pair of elastic materials 6A and 6B acts on the pair of rod-shaped members 4A and 4B as a starting force, such that the pair of rod-shaped members 4A and 4B in a bent state with respect to the pair of solar cell panels 2A and 2B in the undeployed state of the solar cell panels 2A and 2B deploys in the same direction as the pair of solar cell panels 2A and 2B by the elastic force (starting force).

When the deployment of the pair of solar cell panels 2A and 2B and the rod-shaped members 4A and 4B is completed, the pair of radiators 3A and 3B is deployed in the same direction as the deployment direction of the pair of solar cell panels 2A and 2B and the rod-shaped members 4A and 4B by starting the operation of the pair of deployment devices provided between the pair of radiators 3A and 3B and the satellite body 1.

In the deployed state of the solar cell panels 2A and 2B of the nanosatellite S, the pair of reflectors Ra and Rb constituted by the pair of solar cell panels 2A and 2B and the rod-shaped members 4A and 4B face the pair of radiators 3A and 3B in parallel. In addition, the reflector Ra constituted by the solar cell panel 2A and the rod-shaped member 4A is an integral conductor, and the reflector Rb constituted by the solar cell panel 2B and the rod-shaped member 4B is also an integral conductor.

Further, a length of the pair of reflectors Ra and Rb is optimized for the wavelength of radio waves when the pair of radiators 3A and 3B communicates with the earth. That is, the total length of the solar cell panel 2A and the rod-shaped member 4A is set to a length corresponding to ¼ wavelength of the radio waves transmitted and received by the radiator 3A, and the total length of the solar cell panel 2B and the rod-shaped member 4B is set to a length corresponding to ¼ wavelength of the radio waves transmitted and received by the radiator 3B.

That is, in the nanosatellite S of the present embodiment, since the reflector Ra effectively reflects the radio waves radiated from the earth to the nanosatellite S toward the radiator 3A, an antenna gain of the artificial-satellite antenna constituted by the reflector Ra and the radiator 3A is improved compared with the conventional artificial-satellite antenna without the reflector Ra. Since the reflector Ra shields noise radio waves coming from behind, an SN ratio of the received wave received by the radiator 3A from the earth is improved.

In addition, since the reflector Rb effectively reflects the radio waves radiated from the earth toward the radiator 3B, an antenna gain of the artificial-satellite antenna constituted by the reflector Rb and the radiator 3B is improved compared with the conventional artificial-satellite antenna without the reflector Rb. Since the reflector Rb shields noise radio waves coming from behind, an SN ratio of the received wave received by the radiator 3B from the earth is improved.

Therefore, according to the present embodiment, the artificial-satellite antenna is an artificial-satellite antenna mounted in an artificial satellite (nanosatellite S) including a satellite body 1, and the artificial-satellite antenna includes solar cell panels 2A and 2B, radiators 3A and 3B, and conductors (rod-shaped members 4A and 4B) that are mechanically and electrically connected to the solar cell panels 2A and 2B, in which the solar cell panels 2A and 2B and conductors (rod-shaped members 4A and 4B) are used as reflectors Ra and Rb. That is, since the pair of solar cell panels 2A and 2B functions as the pair of reflectors Ra and Rb only by adding the pair of rod-shaped members 4A and 4B to the pair of solar cell panels 2A and 2B, it is possible to improve the antenna performance while suppressing an increase in weight and volume.

The present disclosure is not limited to the above embodiment, and may be, for example, the following modification examples.

(1) In the above embodiment, the radiators 3A and 3B are configured as unipole antennas respectively, but the present disclosure is not limited to this. For example, the radiators 3A and 3B may be configured as dipole antennas respectively.

(2) In the above embodiment, a case where the present disclosure is applied to the nanosatellite S has been described, but the present disclosure is not limited to this. The weight of the artificial-satellite to which the present disclosure is applied is not limited to the nanosatellite S, and can be applied to, for example, a small satellite having a weight of 100 kg to 1000 kg, or an artificial-satellite heavier than the small satellite.

(3) In the above embodiment, the rotating shaft of the pair of hinges 5A and 5B is set parallel to the rear end plane of the satellite body 1, but the present disclosure is not limited to this. For example, the rotating shaft of the pair of hinges 5A and 5B may be set, for example, not parallel to but substantially perpendicular to the rear end plane of the satellite body 1.

(4) In the above embodiment, the pair of solar cell panels 2A and 2B is made to be a pair of the reflectors Ra and Rb by adding the rod-shaped members 4A and 4B to each of the pair of solar cell panels 2A and 2B, but the present disclosure is not limited this.

That is, since the pair of solar cell panels 2A and 2B is provided in the nanosatellite S, the rod-shaped members 4A and 4B are provided in the solar cell panels 2A and 2B, but for an artificial-satellite provided with one solar cell panel, for example, one rod-shaped member is provided. In addition, in a case where the pair of solar cell panels 2A and 2B is provided, only one of the pair of reflectors Ra and Rb may be provided by providing only one of the pair of rod-shaped members 4A and 4B.

(5) Further, the connection structure between the pair of reflectors Ra and Rb and the satellite body 1 is not limited to the structure shown in FIGS. 2 and 3, and a known connection structure between the satellite body and a reflector glass may be appropriately adopted.

INDUSTRIAL APPLICABILITY

According to the artificial-satellite antenna of the present disclosure, it is possible to improve the antenna performance while suppressing the increase in weight and volume.

What is claimed is:

1. An artificial-satellite antenna mounted on an artificial-satellite having a satellite body, the artificial-satellite antenna comprising:
    a solar cell panel;
    a radiator; and
    a conductor that is mechanically and electrically connected to the solar cell panel, wherein
    the solar cell panel has a shape extending in one direction,
    the conductor is connected to the solar cell panel via an elastic material, and protrudes from the solar cell panel on an extension line in the one direction when the solar cell panel is deployed,
    when the solar cell panel is deployed, the radiator protrudes from the satellite body in a same direction as the solar cell panel is deployed, and
    the solar cell panel and the conductor are used as reflectors.

2. The artificial-satellite antenna according to claim 1, wherein
    the conductor is accommodated in a bent state with respect to the solar cell panel when the solar cell panel is not deployed, and is held on the satellite body by a holding portion.

3. The artificial-satellite antenna according to claim 2, wherein
    the holding portion is fused when the solar cell panel is deployed.

4. The artificial-satellite antenna according to claim 1, wherein
    in a case where a pair of the solar cell panels is provided, the conductor is provided on each of the solar cell panels.

5. The artificial-satellite antenna according to claim 1, wherein
    the conductor is a rod-shaped member.

6. The artificial-satellite antenna according to claim 1, wherein
    when the solar cell panel is deployed, the solar cell panel and the conductor are substantially linear when viewed from a direction perpendicular to an extending direction of the conductor and parallel to the solar cell panel.

7. The artificial-satellite antenna according to claim 1, wherein
    the solar cell panel and the conductor are reflectors that reflect radio waves radiated to the artificial-satellite toward the radiator.

8. The artificial-satellite antenna according to claim 2, wherein
    in a case where a pair of the solar cell panels is provided, the conductor is provided on each of the solar cell panels.

9. The artificial-satellite antenna according to claim 3, wherein
    in a case where a pair of the solar cell panels is provided, the conductor is provided on each of the solar cell panels.

10. The artificial-satellite antenna according to claim 2, wherein
    the conductor is a rod-shaped member.

11. The artificial-satellite antenna according to claim 3, wherein
    the conductor is a rod-shaped member.

12. The artificial-satellite antenna according to claim 4, wherein
    the conductor is a rod-shaped member.

13. The artificial-satellite antenna according to claim 8, wherein
    the conductor is a rod-shaped member.

14. The artificial-satellite antenna according to claim 9, wherein
    the conductor is a rod-shaped member.

15. The artificial-satellite antenna according to claim 2, wherein
    when the solar cell panel is deployed, the solar cell panel and the conductor are substantially linear when viewed from a direction perpendicular to an extending direction of the conductor and parallel to the solar cell panel.

16. The artificial-satellite antenna according to claim 3, wherein
    when the solar cell panel is deployed, the solar cell panel and the conductor are substantially linear when viewed from a direction perpendicular to an extending direction of the conductor and parallel to the solar cell panel.

17. The artificial-satellite antenna according to claim 4, wherein
    when the solar cell panel is deployed, the solar cell panel and the conductor are substantially linear when viewed from a direction perpendicular to an extending direction of the conductor and parallel to the solar cell panel.

18. The artificial-satellite antenna according to claim 8, wherein
    when the solar cell panel is deployed, the solar cell panel and the conductor are substantially linear when viewed from a direction perpendicular to an extending direction of the conductor and parallel to the solar cell panel.

19. The artificial-satellite antenna according to claim 9, wherein
    when the solar cell panel is deployed, the solar cell panel and the conductor are substantially linear when viewed from a direction perpendicular to an extending direction of the conductor and parallel to the solar cell panel.

20. The artificial-satellite antenna according to claim 5, wherein
    when the solar cell panel is deployed, the solar cell panel and the conductor are substantially linear when viewed from a direction perpendicular to an extending direction of the conductor and parallel to the solar cell panel.

* * * * *